United States Patent [19]
Jansen et al.

[11] Patent Number: 6,061,601
[45] Date of Patent: May 9, 2000

[54] REDUNDANT DATA PROCESSING SYSTEM HAVING TWO PROGRAMMED LOGIC CONTROLLERS OPERATING IN TANDEM

[75] Inventors: Abraham J. A. M. Jansen; Antonius M. Meuwissen; Behzat Eren; Frederick H. Heutink, all of Eindhoven, Netherlands

[73] Assignee: Nyquist B.V., Eindhoven, Netherlands

[21] Appl. No.: 08/986,018

[22] Filed: Dec. 5, 1997

[30] Foreign Application Priority Data

Dec. 13, 1996 [EP] European Pat. Off. ............... 96203533

[51] Int. Cl.⁷ .............................. G05B 19/18; G05B 9/02
[52] U.S. Cl. ...................................... 700/7; 700/2; 700/82
[58] Field of Search ................................... 364/187, 131, 364/136; 714/10, 11, 13; 700/2, 7, 82

[56] References Cited

U.S. PATENT DOCUMENTS

| | | | |
|---|---|---|---|
| 4,442,486 | 4/1984 | Mayer | 395/186 |
| 4,481,579 | 11/1984 | Kinghorn | 395/824 |
| 4,495,493 | 1/1985 | Segarra et al. | 340/825.5 |
| 4,500,962 | 2/1985 | Lemaire et al. | 722/2 |
| 4,535,449 | 8/1985 | Arragon | 376/457 |
| 4,633,472 | 12/1986 | Krol | 395/182.09 |
| 4,695,944 | 9/1987 | Zandveld et al. | 395/285 |
| 4,723,241 | 2/1988 | Grobel et al. | 395/182.02 |
| 4,853,845 | 8/1989 | Zimmer et al. | 395/566 |
| 4,878,181 | 10/1989 | Mackenna et al. | 345/431 |
| 4,920,511 | 4/1990 | Brier et al. | 395/822 |
| 5,115,507 | 5/1992 | Callemyn | 711/151 |
| 5,127,092 | 6/1992 | Gupta et al. | 395/581 |
| 5,163,048 | 11/1992 | Heutink | 370/402 |
| 5,197,011 | 3/1993 | Biemans et al. | 364/468.02 |
| 5,313,386 | 5/1994 | Cook et al. | 364/187 |
| 5,317,735 | 5/1994 | Schomberg | 395/379 |
| 5,473,764 | 12/1995 | Chi | 395/383 |
| 5,479,621 | 12/1995 | Duranton | 398/384 |
| 5,508,213 | 4/1996 | Van Der Wel et al. | 438/376 |
| 5,530,946 | 6/1996 | Bouvier et al. | 364/230 |
| 5,600,204 | 2/1997 | Jacobs et al. | 313/572 |
| 5,675,776 | 10/1997 | Durnaton | 395/561 |
| 5,734,695 | 3/1998 | Seesing et al. | |

*Primary Examiner*—Albert DeCady
*Assistant Examiner*—Shelly A Chase
*Attorney, Agent, or Firm*—Armstrong Teasdale LLP

[57] ABSTRACT

A tandemized data processing system has a first and a second programmed logic controller and centralized governance for alternatively governing one controller in a master state, whilst allowing the other controller in a standby state. Each controller has a local powering facility and a local bus, and furthermore is attached via a respective bus interface element to a general bus provided with input/output subsystems. The system further has a high-speed serial link between the two controllers. In particular, each local bus has local communication facilities, for consistently enabling user interaction with the master controller.

12 Claims, 5 Drawing Sheets

REDUNDANT DATA PROCESSING SYSTEM HAVING TWO PROGRAMMED LOGIC CONTROLLERS OPERATING IN TANDEM

BACKGROUND OF THE INVENTION

The invention relates broadly to a redundant data processing system. In particular, such a data processing system as based on programmed logic controllers (PLC's) must meet stringent requirements with respect to availability, for being able to control sophisticated industrial and similar systems, inasmuch as failure of the overall system would often be a fatal incident. Under certain circumstances a few minor functions may fail, although anyway, the overall system should remain 'on'. Tandemized data processing systems have been contemplated for some time, but the present invention intends to fill a need for such systems that are flexible, and moreover, may change between various operative conditions through external control as well through internally detecting various types of hazardous conditions.

More in particular, the invention relates to a tandemized data processing system comprising a first and a second programmed logic controller and centralized governance means for alternatively governing one controller in a master state, whilst allowing the other controller in standby state, each controller being provided with a local powering facility and a local bus, and each local bus being attached via a respective bus interface element to a general bus provided with input/output subsystems. Now, although such system provides for automatic interchanging between the two controllers, the inventor has recognized that also adequate and immediate operator interaction with the master controller should be possible at all times.

SUMMARY OF THE INVENTION

In consequence, amongst other things it is an object of the present invention to provide for a persistent and unconditional access facility to the actual master controller. Now, according to one of its aspects, the invention is characterized in that the system furthermore has a high-speed serial link between the first and second controller for communicating status signalizations from the master controller to the other controller, at least one of said buses being provided with local communication facilities for therewith consistently enabling operator interaction with any controller that is actually in said master state. This solution allows for a low cost implementation, inasmuch as the communication facilities are present only once; the interaction may now proceed via the general bus and one of the local buses arranged in series.

Advantageously, each said local bus, as opposed to said general bus, is provided with said local communication facilities for therewith consistently enabling operator interaction with any controller that is actually in said master state or in said standby state. The added redundancy is only slight, but the added functionality allows interaction with the master controller as well as with the non-master controller, provided that the latter is in standby state.

Advantageously, each controller has detection means which are operational in an application program under execution, for in said execution detecting an appropriate stimulus, and for under control of said detecting undertaking immediate activation of the other controller, if in said standby state, in lieu of the actually operational controller. This feature allows for fast and smooth transfer of the master state to the other controller, if need be. Various situations would profit from such transfer.

Advantageously, said centralized governance means are provided with a guard circuit that has mirrored combinatory logic in either controller, and said system furthermore has cross-coupling means between the two controllers, said guard circuit furthermore having a first and a second state for in each thereof controlling a respective one of said controllers as master controller and the other controller in standby. Such guard circuit has certain aspects of a flipflop provided with specific retrocoupling. Regardless of the state of either of the two controllers, a fail-safe operation can be guaranteed. Further advantageous aspects of the invention are recited in dependent claims.

BRIEF DESCRIPTION OF THE DRAWING

These and further aspects and advantages of the invention will be discussed hereinafter with reference to the disclosure of preferred embodiments, and more in particular with reference to the appended Figures that show.

DETAILED DESCRIPTION OF PREFERRED EMBODIMENTS

Figure 1:
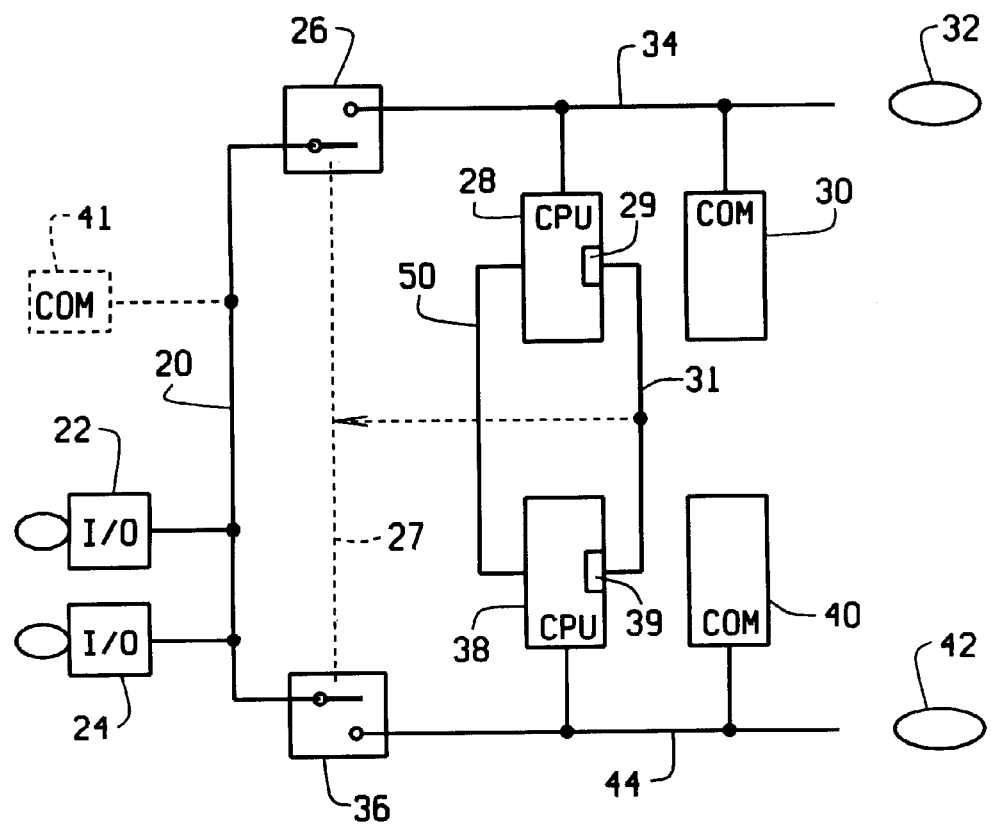
FIG. 1, programmed logic controllers in tandem.

FIG. 1 shows programmed logic controllers arranged and operating in tandem. This means that one of the logic controllers offers all necessary operational functionality as seen from an object to be controlled, but in dependence of various conditions, either one of them can be rendered operational to carry all processing load, the other one being standby to take over when particular changes will occur. If the other controller is for some reason temporarily or permanently disabled, the system may remain operational, be it with lessened robustness. Various such conditions will be explained hereinafter. According to the Figure, the first controller comprises a bus interface 26, a central processing unit or programmed logic controller 28, local communication facilities 30, powering 32, and a local bus 34. The second controller likewise comprises elements 36, 38, 40, 42, 44. The two controllers have as shared facilities I/O subsystems 22, 24 and a general serial bus 20. In a preferred embodiment, buses 20, 34, 44 have five parallel channels, for clock, data, and three control signals, respectively. As shown by ellipses, each I/O subsystem has its own powering facilities. Furthermore, the system comprises high-speed serial link 50 that interconnects the two programmed logic controllers 28, 38; preferably, according to the ethernet standard. In this way, one of the two controllers can be in master mode, whereas the other then is in standby mode, while always allowing the controllers to exchange information via the high speed bus 50. The high-speed and bidirectional serial link 50 transfers certain information regarding the internal state of the master controller, and including such things as I/O-related information, to the other controller. This allows the other controller, as long as it is standby, to be able to immediately take over from the master controller.

As shown, each interface circuit 26, 36 contains a hardware switch, hardware-linked through link 27, for coupling exactly one of the controllers to the general bus 20. The control of the link is by centralized governance, and in particular by a distributed guard circuit that has respective parts 29, 39 in the controllers, linked symbolically by interconnection 31, the state of which controls link 27. In a low-cost version of the above, communication facilities 30, 40 are replaced by a single instance 41 that is connected to general bus 20. In this manner, user communication with the actual master controller is guaranteed. On the other hand, the providing of two separate communication facilities renders the whole arrangement more flexible.

Figure 2:
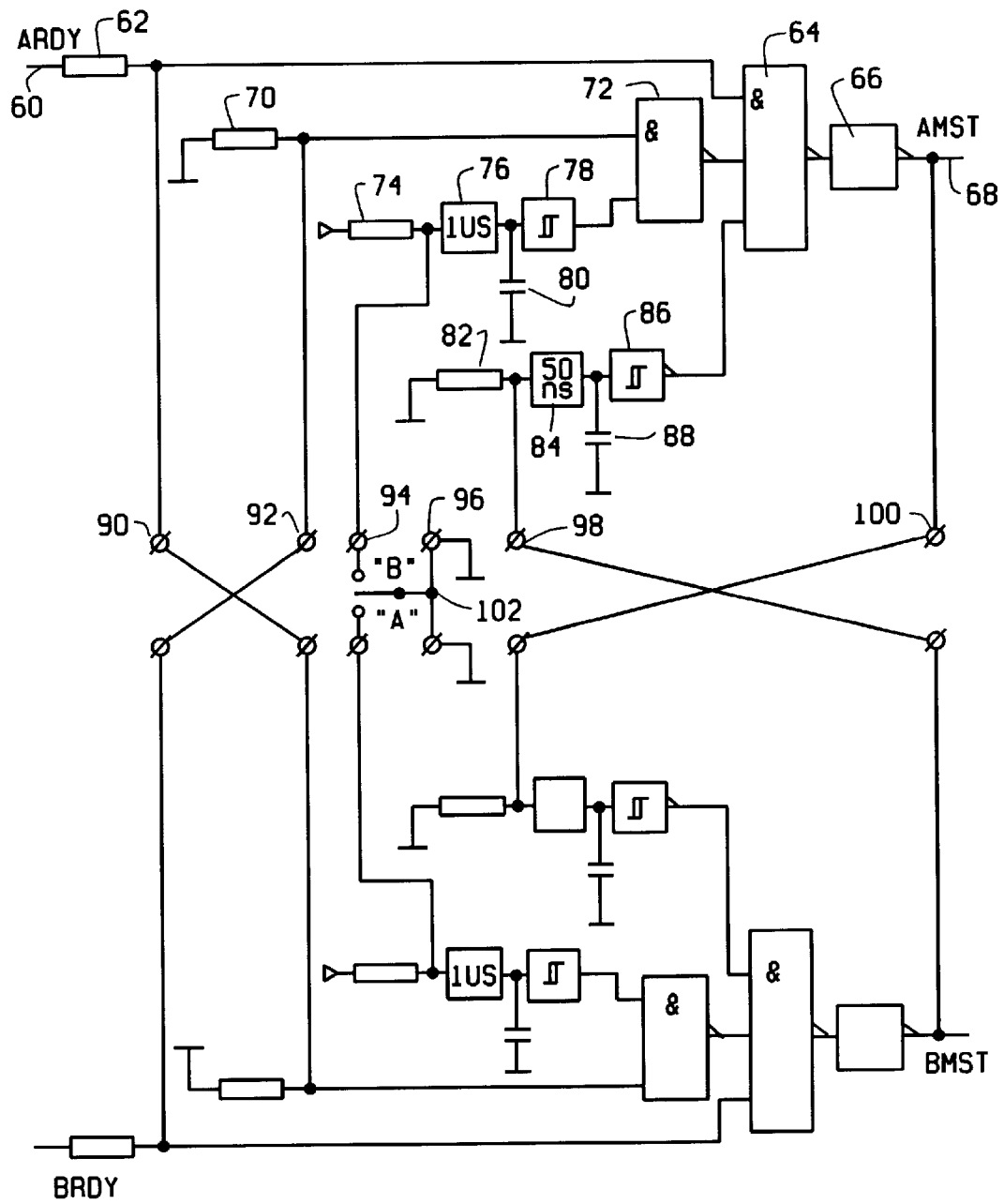
FIG. 2, a guard circuit embodiment.

FIG. 2 is a first embodiment of the distributed guard circuit. The upper half of the Figure, as delimited by the row of interconnection terminals 90–100 forms part of the first or 'A' controller. The lower part of the Figure that has similar, but largely unnumbered components, likewise forms part of the 'B' controller. Switch 102 is a manual switch in an intermediate region and is independent of both 'A' and 'B' controllers; it may be located on the front panel of one of them. In a practical embodiment, the switch is activated by a manual key that can be inserted into a specially provided keyhole. Rotating the key by hand will produce either the upper position or the lower one, but releasing of the key will by means of an appropriate spring, bring it immediately to the central position. This is therefore the default situation.

Now, in the upper part, the A controller may raise input 60 to signal its own readiness. Via resistor 62 this is signalled to NAND 64. If NAND 64 receives three high signals, its output is inverted in item 66, so that an AMASTER signal is produced on output 68. A BMASTER signal received on terminal 98 would, after a 50 nsec delay in item 84 and inversion in level discriminator 86, subsequently permanently block the generating of the AMASTER signal, and vice versa.

A BREADY signal arrives via terminal 92 at NAND 72. As long as the other input of NAND 72 is low, this has no effect on the operation of NAND 64. In this respect, the central position of switch 102 is decisive, because then the output of item 78 is always false, which means that NAND 72 will always produce a true output.

If however, manual switch 102 is temporarily brought into the upper position, this indicates that A is non-master. After switchover to this upper position, the signal thereof is delayed in item 76 by at least 1 microsecond and inverted in discriminator 78, thereby rendering NAND 72's output low. In this respect, item 74 is a pull-up resistor. The circuit thus has a failsafe property, in that any controller that pretends to be master, will inhibit the other controller from becoming master. This will even apply if the former controller is inconsistent by at the same time declaring 'non-ready'. The inventors have recognized that generally a 'master-less' situation must be preferred over a two-master situation. Thus, the controlling of switch 102 is a crucial element of the operation. In this manner, the governance under start conditions of the system gives preference to a particular controller that attains master status first, while therefrom preempting the other controller that comes later.

The circuit disclosed supra caters for various situations: removing a particular CPU or occurrence of a power-down terminates an AMASTER state;
a 'ready' status of the B controller means that this controller is available to be made master, if the A controller would stop being master, and vice versa;
if a master controller detects the other syscon state, this will terminate that master state; this system configurator inter alia assigns addresses to I/O subsystems and generates watchdog signals; I/O in the meantime, remains active. Generally, a master controller will activate it's own syscon, provided that the syscon of the other controller has been disabled. As will be shown with reference to FIG. 4, there are two ways to enable syscon: either directly, or through the vanishing of the other syscon. 'master' connection to the other terminal of switch 102 will quickly terminate the erroneous master state.

Figure 3:
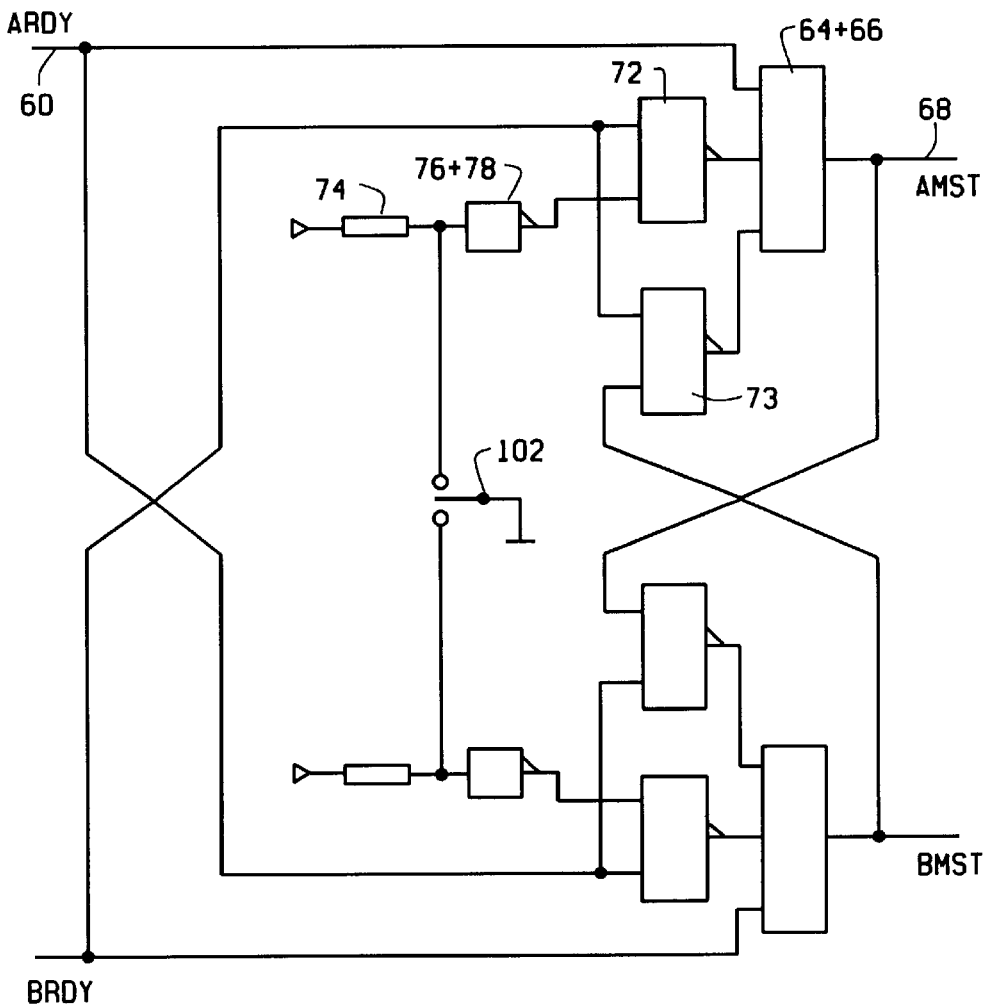
FIG. 3, a modification of FIG. 2.

FIG. 3 is a modification of FIG. 2, corresponding items having identical numbering, whereas certain elements were combined and a few minor elements omitted. The main difference is the introduction of further NAND-gate 73 to replace delaying-threshold items 84, 86. Now, if the other controller will send incongruous signals i.e., XREADY= false and XMASTER=true, then something is wrong either in the arbitration, or in the wiring between the two controllers. A first, straightforward reaction is taken in FIG. 3: consider the incongruity as being due to the other controller: as long as BREADY is false, NAND 73 will generate a true signal, thus allowing AMASTER to become true: a controller generally may only become master under the condition that it is ready.

A more thoughtful reaction is as follows: in the unlikely event of a failure in this small part of the overall system, let the whole system go 'down' in a more or less controlled fashion. One possibility is to let both controllers go into standby state.

Figure 4:
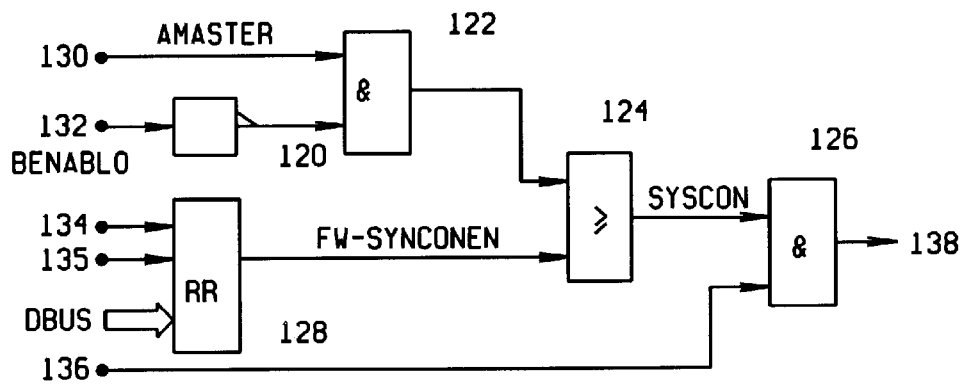
FIG. 4, the functionality of the syscon signal.

FIG. 4 shows the processing of the syscon signal, which as explained supra, is used for crosscoupling the readiness signals between the two controllers. Input 130 receives the AMASTER signal (68 in FIG. 2). Input 132 receives the BENABLE signal. Inversion of the latter in inverter 120 is ANDED in gate 122. This represents the hardware branch. The remainder of the arrangement represents the software branch.

Reset register 128 is fed by the databus as shown. Furthermore, it stores the AREADY signal received on input 134 and the AENABLE signal received on input 135. In this way, by means of the data bus, the firmware signal FW-SYSCON-enable is activated. The latter is ORED in gate 124 with the output from AND 122, thereby constituting the SYSCON signal. The latter is in NAND gate 126 combined with signal AREADY received on input 136, for outputting on output 138. The latter is processed as described supra.

Figure 5:
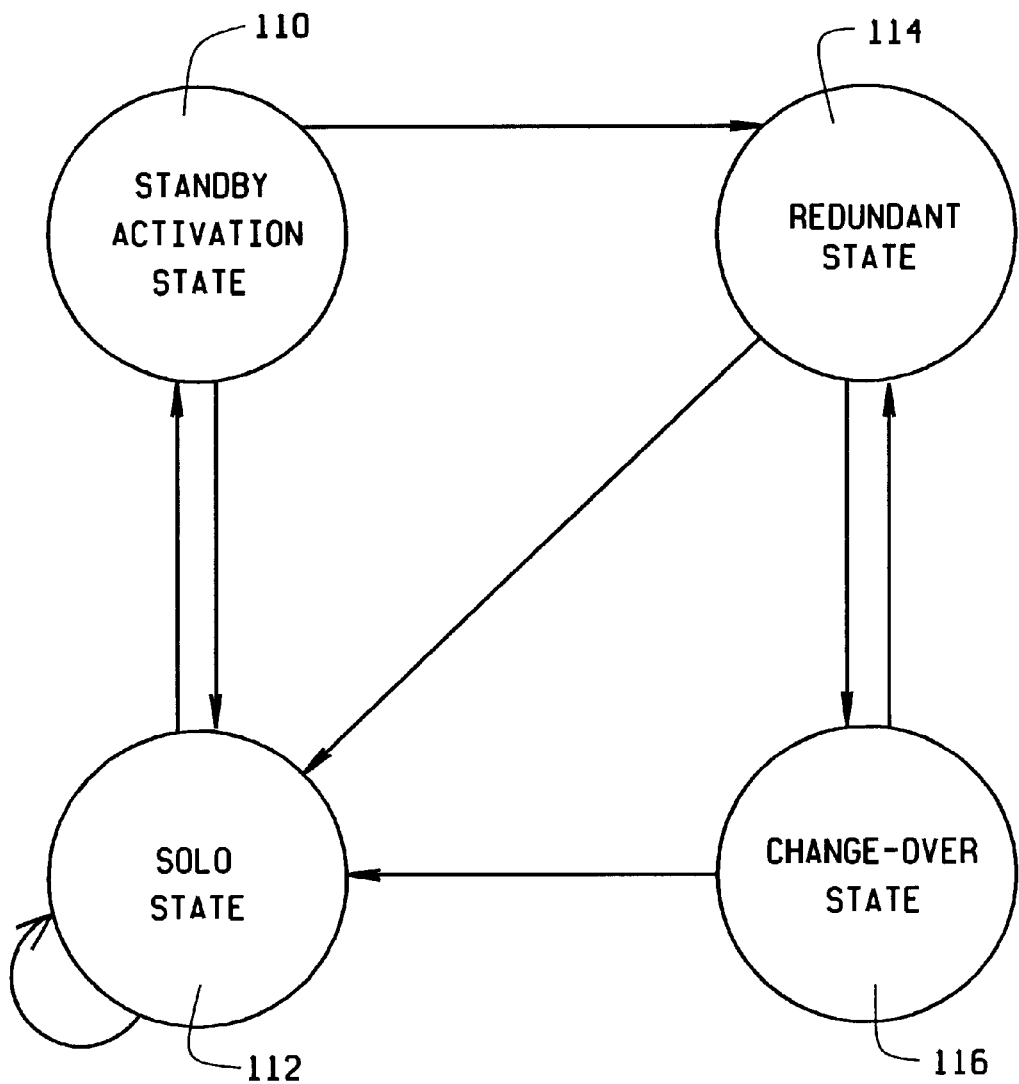
FIG. 5, the relation between the redundancy states.

FIG. 5 gives the relation between the redundancy states; the persistent states are the Redundant STATE 114 (one controller operative, the other standby: this offers the possibility to change to the other controller such as by activating switch 102 in FIG. 2), and 112 (one controller operative, the other down). Exit is to Change-over STATE 116 under control of change-over requested such as by an operator, OR Error in Master; the latter offers the possibility to immediately change-over to the other controller, provided that the latter is standby indeed. Return is under control of Change-over successful. Exit from 114 to Solo STATE 112 is under control of Error in Standby OR Patch/download requested, for example, if a new program must be downloaded. Exit from 116 to 112 is under control of Error in Standby. Persistence in 112 is under control of No control program present: in this state, no data transfer takes place between the two controllers. State 112 is left to Standby Activation STATE 110 under control of (Re)Start Standby, return is under control of Error. Exit from 110 to 114 is under control of Update complete. In the diagram, 112 and 114 are user states, the other two operate as intermediate states, that in principle are invisible to a user. Therefore, downloading is always effected on the standby controller. Stopping of the application is only done on the standby controller; if the master would stop, both controllers would become redundant.

State 112 may be caused on any of the following preconditions:

one of the two controllers is inoperative (standby-error-abort)
patch or download is being executed
change-over is in progress
both controllers are in start-up condition
one or both controllers lack a control program
the control programs are not Hot Start compatible
failure in data transfer between the two controllers
Non-fatal programming error occurred on the master controller
Hardware Watchdog expired on either of the two controllers.

Figure 6:
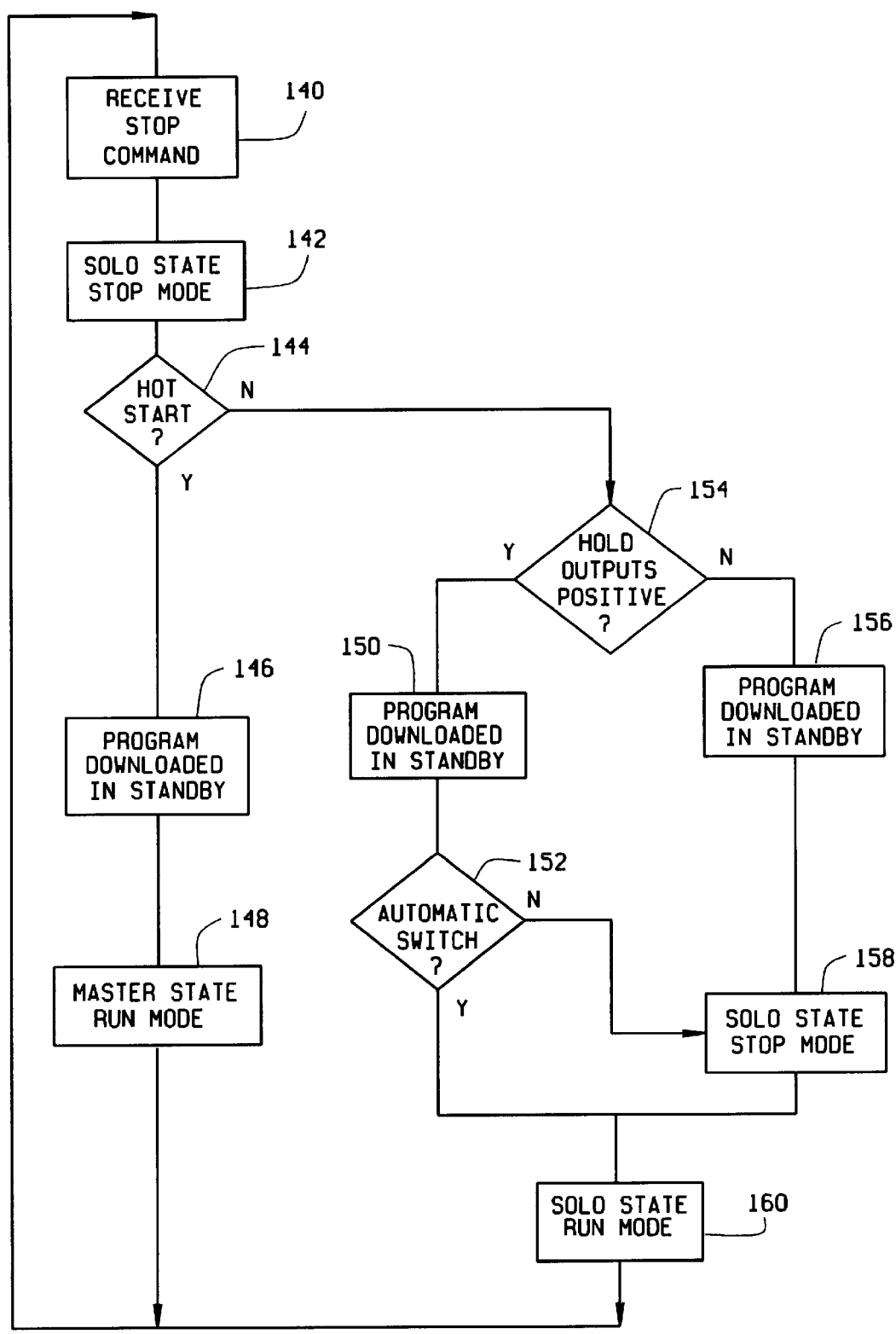
FIG. 6, a flow chart relative to the hold outputs.

FIG. 6 is a flow chart relative to the hold outputs. Block 140 represents a particular controller in standby non-master (redundant) state and in RUN mode. If the controller receives a stop command, that allows standby, the controller goes to block 142, going in SOLO state and STOP mode. If the controller is ready to receive an application program or the like ('ready for download'), in block 144 the 'hot start' is checked. If yes, the program is downloaded in standby state, whereupon the controller in question is again standby in a redundant state, and in RUN mode (like in block 140). If now, manual switch 102 in FIG. 2 is switched over, the controller in question assumes master state and RUN mode. In principle, now the system is operable as long as feasible. If in block 144, the outcome is negative, in block 154 the hold outputs are checked. If positive, the program is downloaded in standby, just like on the connection 144–146. The controller thereupon comes into block 152: as standby controller in Solo State and STOP mode (same as in block 142). In block 152, the need for an automatic switch is detected. If so, the controller in question assumes master state and executes an automatic start from the init_task facility (cold start). Thereupon, the controller in question functions as MASTER controller in solo State and RUN mode (block 160). This optionally also controls a switch-over to the other controller with a download start action.

If in block 154 the outcome is negative, the controller executes a download in standby, which results in being the Standby controller in the Solo state and STOP mode, as in blocks 142, 150. Next, a switch-over may be initiated by the switch 102, like in the connection between blocks 146, 148: now, the particular output signals are reset. If so, the controller goes to block 158, and becomes MASTER controller in Solo state and STOP mode. This block is also attained if the detection in block 152 had a negative outcome. Subsequently, a start is executed, and the controller arrives in block 160. The state may prevail.

We claim:

1. A tandemized data processing system comprising a first and a second programmed logic controller and centralized governance means alternatively governing one controller in a master state, whilst allowing the other controller in standby state, each controller being provided with a local powering facility and a local bus, and each local bus being attached via a respective bus interface element to a general bus provided with input/output subsystems, characterized in that the system furthermore has a high-speed serial link between the first and second controller for communicating status signalizations from the master controller to the other controller, at least one of said buses being provided with local communication facilities for therewith consistently enabling operator interaction with any controller that is actually in said master state, said centralized governance means comprising a guard circuit, said guard circuit configured to have a first state and a second state wherein a respective one of said controllers is a master and said other controller is in standby, and a third state and a fourth state for blocking master operation of said first and second controller, respectively.

2. A data processing system as claimed in claim 1, characterized in that each said local bus, as opposed to said general bus, is provided with said local communication facilities for therewith consistently enabling operator interaction with any controller that is actually in said master state or in said standby state.

3. A data processing system as claimed in claim 1, characterized in that each controller has detection means which are operational in an application program under execution, for in said execution detecting an appropriate stimulus, and for under control of said detecting undertaking immediate activation of the other controller, if in said standby state, in lieu of the actually operational controller.

4. A data processing system as claimed in claim 1, characterized in that said guard circuit comprises mirrored combinatory logic in either controller, and said system furthermore has cross-coupling means between the two controllers.

5. A data processing system as claimed in claim 1, wherein said third and fourth temporary states are activatable through external control.

6. A data processing system as claimed in claim 5, wherein said first and second states are joined into a single superstate under further external control that is a default control.

7. A data processor as claimed in claim 4, wherein said centralized governance means comprise preemption means for under start conditions of said data processing system giving preference to a particular controller first attaining master status over the other coming later.

8. A tandemized data processing system comprising a first programmed logic controller, a second programmed logic controller, each said controller coupled to a local bus, and each said local bus coupled to a general bus provided with input/output subsystems, a high-speed serial link coupled between said first controller and said second controller, said system further comprising a centralized governance unit configured to alternatively govern one of said first and second controllers in a master state, said centralized governance unit comprising a guard circuit configured to have a first state and a second state wherein a respective one of said controllers is a master and said other controller is in standby, and a third state and a fourth state for blocking master operation of said first and second controller, respectively.

9. A data processing system as recited in claim 8 wherein said guard circuit comprises mirrored combinatory logic in either controller, and said system further comprises cross-coupling means between said controllers.

10. A data processing system as recited in claim 8 wherein each said local bus comprises local communication facilities for enabling operator interaction with said controllers.

11. A data processing system in accordance with claim 8 wherein said third state and said fourth states are activatable through external control.

12. A data processing system in accordance with claim 8 wherein said centralized governance unit comprises preemption means for giving preference to a particular controller first attaining master status.

\* \* \* \* \*